United States Patent [19]

Kobayashi

[11] Patent Number: 4,591,453

[45] Date of Patent: May 27, 1986

[54] ELECTROLYTIC SOLUTION FOR A REDOX SYSTEM

[75] Inventor: Kenkichiro Kobayashi, Kawasaki, Japan

[73] Assignee: Semiconductor Energy Laboratory Co., Ltd., Tokyo, Japan

[21] Appl. No.: 647,792

[22] Filed: Sep. 6, 1984

Related U.S. Application Data

[63] Continuation of Ser. No. 462,971, Feb. 1, 1983, abandoned.

[30] Foreign Application Priority Data

Feb. 1, 1982 [JP] Japan .................................. 57-14585

[51] Int. Cl.$^4$ ............................................. H01M 4/88
[52] U.S. Cl. .................................. 252/182.1; 429/188; 429/194; 429/199
[58] Field of Search ...................... 252/182.1; 429/188, 429/194, 197, 199, 213; 350/357

[56] References Cited

U.S. PATENT DOCUMENTS

| | | | |
|---|---|---|---|
| 3,806,229 | 4/1974 | Schoot et al. | 350/357 |
| 3,953,235 | 4/1976 | Blomgren et al. | 429/197 |
| 4,073,570 | 2/1978 | Korinek | 350/357 |
| 4,116,535 | 9/1978 | Ponjeé et al. | 350/357 |
| 4,285,575 | 8/1981 | Imataki et al. | 350/357 |
| 4,343,871 | 8/1982 | Tobishima et al. | 429/197 |
| 4,348,077 | 9/1982 | Kondo et al. | 350/357 |

*Primary Examiner*—John F. Terapane
*Assistant Examiner*—Anne Brookes
*Attorney, Agent, or Firm*—Gerald J. Ferguson, Jr.

[57] ABSTRACT

An electrolytic solution for use in a redox system, including is a nonaqueous solvent which is acetonitrile or propylene carbonate and an electrolyte, which is a complex salt including dipyridyl or phenanthroline and a metal ion.

2 Claims, No Drawings

ELECTROLYTIC SOLUTION FOR A REDOX SYSTEM

This is a continuation application of Ser. No. 462,971, filed Feb. 1, 1983, now abandoned.

BACKGROUND OF THE INVENTION

1. Field of the Invention

The present invention relates to an electrolytic solution for use in a redox system.

2. Description of the Prior Art

A conventional electrolytic solution for use in the redox system usually employs an aqueous solvent, and hence is acidic or alkaline.

The conventional electrolytic solution of this kind is low in electric conductivity, as a result of which effective anodic reaction and cathodic reaction are difficult to obtain in the redox system.

Moreover, since the conventional electrolytic solution employs an aqueous solution, a drawback is that, when used in an electrolytic cell employing an ion exchange film, such as a chargeable battery, the ion exchange film is badly swollen and made useless.

In addition, the conventional electrolytic solution is acidic or alkaline, and hence disadvantageously dissolves the container and electrodes forming the redox system, or disadvantageously, forms oxide films on the electrodes, which shortens the useful life of the electrodes.

Furthermore, the conventional electrolytic solution is acidic or alkaline, and consequently it is harmful.

SUMMARY OF THE INVENTION

It is therefore an object of the present invention to provide a novel electrolytic solution for use in the redox system which is free from the abovesaid defects of the prior art.

DESCRIPTION OF THE PREFERRED EMBODIMENTS

The electrolytic solution for use in a redox system, according to the present invention, employs a nonaqueous solvent which is acetonitrile expressed by $$CH_3CN \quad (1)$$

or propylene carbonate expressed by $$\begin{array}{c} CH_3-CH-CH_2 \\ | \quad | \\ O \quad O \\ \backslash \ / \\ C \\ \| \\ O \end{array} \quad (2)$$

The electrolyte used is a complex salt including dipyridyl expressed by $$2,2'\text{-dipyridyl}[(C_5H_4N)_2] \quad (3a)$$

$$4,4'\text{-}(CH_3)_2\text{dipyridyl} \quad (3b)$$

$$(NH_3)_4\text{dipyridyl} \quad (3c)$$

or $$5,5'\text{-}(CH_3)_2\text{dipyridyl} \quad (3d)$$

or phenanthroline expressed by $$1,10(\text{or ortho})\text{phenanthroline} \quad (4a)$$

$$4,7\text{-}(C_6H_4SO_3)_2\text{phenanthroline} \quad (4b)$$

$$4,7\text{-}(CH_3)_2\text{phenanthroline} \quad (4c)$$

or $$5,6\text{-}(CH_3)_2\text{phenanthroline} \quad (4d)$$

and metal ion.

The metal ion may be titanium (Ti), vanadium (V), chromium (Cr), manganese (Mn), cobalt (Co), nickel (Ni) or copper (Cu) ion, but it is preferable to employ iron (Fe), ruthenium (Ru) or osmium (Os) ion.

The electrolyte of the electrolytic solution of the present invention may preferably be a complex salt which includes the following dipyridyl or phenanthroline and the metal ion.

$$Fe(\text{dipyridyl})_3X_2 \quad (5a)$$

$$Fe(\text{phenanthroline})_3X_2 \quad (5b)$$

$$Ru(\text{dipyridyl})_3X_2 \quad (6a)$$

$$Ru(\text{phenanthroline})_3X_2 \quad (6b)$$

$$Os(\text{dipyridyl})_3X_2 \quad (7a)$$

$$Os(\text{phenanthroline})_3X_2 \quad (7b)$$

where X is a chlorine peroxide radical expressed by $(ClO_4)^{2-}$.

According to the electrolytic solution of the present invention, in the case where the electrolyte is a complex salt of dipyridyl of phenanthroline (identified by R) with the metal ion which is iron (Fe), ruthenium (Ru) or osmium (Os) ion (metals of such metal ions being identified by M), there occurs an anodic reaction (injection of electrons from the electrolytic solution into an electrode) expressed by the following anodic oxidation reaction formula (8a) or (9a) and a cathodic reaction (injection of electrons from an electrode into the electrolytic solution) expressed by the following cathodic reduction reaction formula (8b) or (9b) (e being electron):

$$M(R)_3{}^{2+} \rightarrow M(\text{dipyridyl})_3{}^{3+} + e^- \quad (8a)$$

$$M(R)_3{}^{3+} + e^- \rightarrow M(\text{dipyridyl})_3{}^{2+} \quad (8b)$$

$$M(R)_3{}^+ \rightarrow M(\text{dipyridyl})_3{}^{2+} + e^- \quad (9a)$$

$$M(R)_3{}^{2+} + e^- \rightarrow M(\text{dipyridyl})_3{}^+ \quad (9b)$$

According to the electrolytic solution of the present invention, since the solvent is acetonitrile or propylene carbonate and since the electrolyte is a complex salt of dipyridyl or phenanthroline with the metal ion, the electrolyte can be dissolved in the solvent in as large a quantity as 0.5 mol% or more.

In the case where the solvent is acetonitrile and the electrolyte is a complex salt of dipyridyl with the iron ion, the electrolyte can be dissolved in the solvent in an amount of 2 mol% at room temperature, 4 mol% at 50° C. and 5 mol% at 70° C.

Also in the case where the solvent is acetonitrile and the electrolyte is a complex salt of phenanthroline with the iron, ruthenium or osmium ion, where the solvent is propylene carbonate and the electrolyte is a complex salt of dipyridyl with the iron, ruthenium or osmium ion, or where the solvent is propylene carbonate and the electrolyte is a complex salt of phenanthroline with the iron, ruthenium or osmium ion, a large quantity of the electrolyte can similarly be dissolved in the solvent as in the case where the solvent is acetonitrile and the electrolyte is a complex salt of dipyridyl with the iron ion.

Furthermore, the electrolytic solution of the present invention permits dissolution of a large amount of electrolyte in the solvent, and hence has a high degree of electric conductivity.

In the case where the solvent is acetonitrile, the electrolyte is a complex salt of dipyridyl with the iron ion and the electrolyte is dissolved in the solvent in an amount of 2 mol% at room temperature, 4 mol% at 50° C. and 5 mol% at 70° C., respectively, as described above, the electrolytic solutions have as high electric conductivities as $5 \times 10^{-2} (\Omega cm)^{-1}$ at room temperature, 3 to $7 \times 10^{-1} (\Omega cm)^{-1}$ at 50° C. and 1 to $5 (\Omega cm)^{-1}$, respectively.

Also in the case where the solvent is acetonitrile and the electrolyte is a complex salt of phenanthroline with the iron, ruthenium or osmium ion, where the solvent is propylene carbonate and the electrolyte is a complex salt of dipyridyl with the iron, ruthenium or osmium ion, or where the solvent is propylene carbonate and the electrolyte is a complex salt of phenanthroline with the iron, ruthenium or osmium ion, the electrolytic solution similarly has a high degree of electric conductivity as in the case where the solvent is acetonitrile and the electrolyte is a complex salt of dipyridyl with the iron ion.

Since the electrolytic solution of the present invention has such a high electric conductivity as described above, it is suitable for use in an electrolytic cell, in particular, a chargeable battery.

An example of the chargeable battery for use with the electrolytic solution of the present invention has a container for the electrolytic solution. In the container are disposed an anode and a cathode. The electrolytic solution in the container is separated by an ion exchange film into an anode side electrolytic solution and a cathode side electrolytic solution.

With such a chargeable battery, when a load is connected across the anode and the cathode, the following discharge to the load takes place: On the side of the anode, the cathodic reaction is caused which is expressed by the aforementioned cathodic reduction reaction formula (8b) and, on the side of the cathode, the anodic reaction is caused which is expressed by the aforementioned anoide oxidation reaction formula (9a). As a result of this, a current from the anode to the cathode is applied to the load connected therebetween.

When an external power source for charging use, positive on the anode side, is connected between the anode and the cathode, the battery is charged in the following manner: The anodic reaction and cathodic reaction expressed by the aforementioned formulae (8a) and (9b), respectively, are developed on the sides of the anode and the cathode, respectively, charging the battery.

According to the electrolytic solution of the present invention, when the cathodic reaction expressed by the aforementioned cathodic reduction reaction formula (8b) is carried out (R being dipyridyl), a reduction potential is +1.0 to +1.1 volt (saturated calomel electrode, SCE) in the case of the iron ion, +1.2 to 1.3 volt (SCE) in the case of the ruthenium ion and +0.8 to 0.85 volt (SCE) in the case of the osmium ion.

When the cathodic reaction expressed by the aforementioned cathodic reduction reaction formula (9b) is caused (R being dipyridyl), the reduction potential is −1.2 to −1.3 volt (SCE) in the case of the iron ion, −1.23 to −1.3 volt (SCE) in the case of the ruthenium ion, and −1.2 to −1.25 volt (SCE) in the case of the osmium ion.

Furthermore, when used in the battery employing the aforesaid ion exchange film, the electrolytic solution of the present invention does not unnecessarily swell the film since the solvent used in the present invention is a nonaqueous solvent. Accordingly, the electrolytic solution of the present invention assures a long service life to the ion exchange film, and hence is suitable for use in the aforesaid chargeable battery.

Moreover, since the electrolytic solution of the present invention has no strong acidity or alkalinity, it does not dissolve the electrodes and container forming the redox system nor does it form oxide films on the electrode; therefore, the use of the electrolytic solution of the present invention does not shorten the life time of the electrodes.

Furthermore, the electrolytic solution of the present invention has no strong acidity or alkalinity as mentioned above, and hence is harmless.

It will be apparent that many modifications and variations may be effected without departing from the scope of the novel concepts of the present invention.

What is claimed is:

1. An electrolytic solution for use in a redox system consisting of: a nonaqueous solvent which is acetonitrile or propylene carbonate; and an electrolyte which is a complex salt including 2,2′-dipyridyl or 1,10-phenanthroline and a metal ion selected from the group consisting of ions of Fe, Ru and Os; wherein the electrolyte is dissolved in the solvent in an amount of at least 0.5 mol % and wherein the electrolytic solution has an electric conductivity of at least $5 \times 10^{-2} (\Omega cm)^{-1}$ at room temperature.

2. The electrolytic solution according to claim 1, wherein the electrolyte is $MR_3X_2$ wherein M is Fe, Ru or Os; R is 2,2′-dipyridyl or 1,10-phenanthroline; and X is $ClO_4$.

* * * * *